United States Patent Office 3,420,640
Patented Jan. 7, 1969

3,420,640
PROCESS FOR DEPLETING $^{17}O$ AND $^{18}O$ IN $^{238}PuO_2$
John A. Porter, Williston, S.C., assignor to the United States of America as represented by the United States Atomic Energy Commission
No Drawing. Filed Sept. 6, 1967, Ser. No. 667,048
U.S. Cl. 23—344
Int. Cl. C01g 56/00
5 Claims

ABSTRACT OF THE DISCLOSURE

A process for preparing $^{238}PuO_2$ having a low neutron emission rate by depleting the oxide in $^{17}O$ and $^{18}O$ isotopes. Solid phase $^{238}PuO_2$, heated to about 700° C., is contacted with water vapor (steam) that is depleted in $^{17}O$ and $^{18}O$ to effect an exchange of oxygen isotopes and thereby deplete the $^{238}PuO_2$ in $^{17}O$ and $^{18}O$.

BACKGROUND OF THE INVENTION

The invention described herein was made in the course of or under a contract with the U.S. Atomic Energy Commission.

Field of the invention

This invention relates generally to improved $^{238}PuO_2$ for use as an isotopic energy source and more particularly to a process for preparing $^{238}PuO_2$ that has a relatively low neutron emission rate.

Description of the prior art

The plutonium-238 isotope is known as a useful source of isotopic energy. In its elemental form this isotope requires only light shielding because most of its energy emission is in the form of alpha radiation that is readily absorbed. The isotope also emits a small quantity of low energy gamma radiation and only a few neutrons by spontaneous fission. However, for use in high temperature heat sources, plutonium-238 is preferably used in the form of a compound, such as $^{238}PuO_2$, having a higher melting point and greater chemical stability than the metal. Although, $^{238}PuO_2$ has many desirable properties that make it a useful energy source up to relatively high temperatures, it unfortunately emits a substantial number of neutrons due to the ($\alpha$, n) reaction with the $^{17}O$ and $^{18}O$ isotopes that are present in oxygen having a natural isotopic distribution (99.759% $^{16}O$, 0.037% $^{17}O$, 0.204% $^{18}O$). The ($\alpha$, n) reaction does not take place with $^{16}O$. Thus, the use of $^{238}PuO_2$ is greatly limited by radiation caused by neutron emissions that require extensive protective shielding. It is, therefore, desirable to substantially reduce the neutron emission rate of $^{238}PuO_2$ by depleting this compound in $^{17}O$ and $^{18}O$ isotopes.

Several methods have been suggested to accomplish this depletion. $^{238}Pu$ is usually recovered from irradiated nuclear reactor targets as a salt, such as a nitrate salt. It has been suggested that the salt be reduced to the metal and then reacted with the $^{16}O_2$ isotope. However, this method is expensive and somewhat hazardous. Another method is to precipitate the $^{238}Pu$ from solution as the oxalate (depleted in $^{17}O$ and $^{18}O$) and then calcine this salt to form the oxide. This method does not give the desired depletion if the process is carried out in a solution of ordinary water apparently because oxygen isotope exchange occurs between the oxalate ion and the natural oxygen water of hydration during the calcination step.

SUMMARY OF THE INVENTION

Accordingly, it is an object of the present invention to provide $^{238}PuO_2$ having reduced neutron emission. It is another object to provide a process for preparing $^{238}PuO_2$ that is substantially depleted in $^{17}O$ and $^{18}O$ isotopes.

In accordance with the present invention, it has been found that $^{238}PuO_2$ having a relatively low neutron emission rate can be prepared from $^{238}PuO_2$ having a natural abundance (or distribution) of oxygen isotopes by intimately contacting the $^{238}PuO_2$ in the solid phase with steam depleted in $^{17}O$ and $^{18}O$ isotopes at relatively high temperatures to effect the exchange of $^{16}O$ for a major portion of the $^{17}O$ and $^{18}O$ originally present in the $^{238}PuO_2$ compound. Thus, $^{238}PuO_2$, substantially depleted in the isotopes $^{17}O$ and $^{18}O$, is recovered and the resulting compound has a relatively low neutron emission rate. It has been found that the temperature of the solid phase $^{238}PuO_2$ during intimate contact with the steam should be in the range of about 500° C. to 800° C.

$^{238}PuO_2$, having a low neutron emission rate as a result of the depletion of $^{17}O$ and $^{18}O$ isotopes, is useful as a source of alpha radiation and requires only minimum shielding. Useful applications for this compound includes heat source energy supplies for cardiac pacemakers and artificial heart pumps and for space exploration vehicles, in particular for manned flights where shielding weight must be kept to a minimum.

DESCRIPTION OF THE PREFERRED EMBODIMENT

Plutonium dioxide, (viz. $^{238}PuO_2$) having a natural abundance of oxygen isotopes (99.759% $^{16}O$, 0.037% $^{17}O$, and 0.204% $^{18}O$), is used as starting material in the present process. Nonrefractory $^{238}PuO_2$ material must be used as the starting material because it has been found that refractory $PuO_2$ shows little or no oxygen exchange even at temperatures above 800° C. Other physical and chemical characteristics of the $^{238}PuO_2$ starting material are not critical. Solid phase oxide in powder form (predominantly 15–40 micron particles) or in the form of microspheres (up to several hundred microns in diameter) prepared by the sol-gel process (see USAEC Report ORNL–3945) has been found particularly suitable for the present oxygen isotopic exchange.

Although either batch or continuous countercurrent contacting methods may be used, batch countercurrent contacting is generally suitable for the relatively small quantites of material to be contacted. If large quantities of material are to be contacted, continuous countercurrent contacting is, of course, preferred. $^{238}PuO_2$ starting material for batch contacting is placed in a suitable reaction vessel, such as a conventional solids-gas contacting column or bed that is provided with a heating means for heating the oxide starting material and with means for passing a gas through the bed of starting material. The reaction vessel containing the $^{238}PuO_2$ is then heated to a temperature of about 500° C. to 800° C., preferably to about 700° C. Although higher temperature may be used, they are preferably avoided because at a temperature near or above 1000° C. the oxide tends to convert to the refractory form which undergoes little or no oxygen exchange. Lower temperatures may also be used, but are preferably avoided because of slower rates and less extensive exchange of oxygen isotopes.

Water, depleted in $^{17}O$ and $^{18}O$ isotopes, is vaporized to form steam and then passed through the bed of heated $^{238}PuO_2$ so that there is an intimate and efficient contact between the steam and the heated oxide. A thermal diffusion technique, that is well known to those skilled in the art, is used to prepare water depleted in $^{17}O$ and $^{18}O$. This method is described in the reference: I. Lauder, "Separation of the Oxygen Isotopes by Thermal Diffusion," Trans. Faraday Soc., 43, 620 (1947). Water depleted in $^{17}O$ and $^{18}O$, suitable for use in the present invention, is commercially available from Volk-Isotopes, Westwood, N.J. Various depletions of $^{17}O$ and $^{18}O$ are available, as low as 0.007% for each isotope. After the steam has passed through the oxide bed, it is condensed to isolate the water vapor from the oxide product. The mole ratio of oxygen in the steam to oxygen in $^{238}PuO_2$ is not critical, except that a sufficient amount must be used so that a substantial depletion of $^{17}O$ and $^{18}O$ occurs. A preferred mole ratio is in the range of from about 1:1 to 10:1. The pressure during contacting is not critical and may be from vacuum to superatmospheric pressure.

The $^{238}PuO_2$ product, recovered after contacting with $^{17}O$ and $^{18}O$ depleted steam, is substantially depleted in the isotopes of $^{17}O$ and $^{18}O$ indicating that an exchange of $^{16}O$ isotope for a major portion of $^{17}O$ and $^{18}O$ in the $^{238}PuO_2$ starting material takes place during the contacting step. This result is also substantiated by a significant decrease in the neutron emission rate, thereby providing $^{238}PuO_2$ in useful form for use as an isotopic energy source. This $^{238}PuO_2$ product, having a relatively low neutron emission rate, may then be further processed, such as by calcining and encapsulating, for use as isotopic energy sources.

Although the above description and the following examples refer to $^{238}PuO_2$ having a "natural abundance" of oxygen isotopes, it will be apparent to those skilled in the art that the process is equally applicable to $^{238}PuO_2$ having more or less than the natural abundance of $^{17}O$ and $^{18}O$ and that the oxygen isotope exchange with water vapor will occur for any concentration of isotopes provided there is a difference in the oxygen isotope abundance between $^{238}PuO_2$ and water vapor. It will also be recognized that the major source of $(\alpha, n)$ reaction is the isotope $^{18}O$, not only because it occurs in larger quantity in natural oxygen, but also because it has a larger cross section for this reaction than does $^{17}O$. Therefore, as between $^{17}O$ and $^{18}O$, more effort should be directed to the depletion of $^{18}O$ which is the most significant source of the objectionable neutron emission from $^{238}PuO_2$.

The present invention is further illustrated by the following specific example:

EXAMPLE I 0.15 gram of $^{238}PuO_2$ powder starting material (predominantly 15 to 40 micron particles) having a natural abundance of oxygen isotopes was placed in a platinum boat, sealed in an evacuated quartz tube and heated to 700° C. Water depleted in $^{17}O$ (0.013%) and $^{18}O$ (0.014%) was slowly vaporized, the resulting steam was passed over the heated oxide, and condensed to isolate it from the oxide. Equilibration was completed in about 45 minutes. The results and further parameters are shown in the following Table I:

TABLE I

| Material | Wt. (g.) | Oxygen mole ratio | $^{18}O$ (percent) Initial | $^{18}O$ (percent) Final |
|---|---|---|---|---|
| $^{238}PuO_2$ | 0.15 | 1 | 0.204 | 0.036 |
| $H_2O$ | 0.10 | 5 | 0.014 | |

It will be noted that the $^{18}O$ content of the $^{238}PuO_2$ was reduced from 0.204% to 0.036%, a reduction of about 82%. This resulted in a substantial decrease in neutron emission rate from 18.0 to 6.1 $n$/(sec.)(mg. $^{238}Pu$), a reduction of about 66%. Thus, substantial depletion of objectional oxygen isotopes occurs in spite of the relatively inefficient contacting method used in this example.

EXAMPLE II

One mmole, 0.27 g., of nonrefractory $PuO_2$ microspheres ($\sim$100 micron diameter particles) (natural oxygen, 0.204% $^{18}O$) was placed in a platinum boat and heated to 700° C. within an evacuated quartz tube. The oxide was outgassed and 13.9 mmole, 0.25 g., of $^{18}O$ depleted water vapor (0.007% $^{18}O$) at about 25 mm. pressure was passed over the $PuO_2$. The oxide was equilibrated with the water vapor for about 30 minutes. The extent of oxygen exchange was calculated on the basis of $^{18}O$ analysis of the final water vapor and $PuO_2$. Oxygen exchange was generally complete under the above conditions. Complete oxygen exchange is defined as attainment of isotopic equilibrium, i.e. essentially identical oxygen compositions in the water vapor and the oxide. The final $^{18}O$ content of the $PuO_2$ was 0.048%.

EXAMPLE III

The procedure of Example II was used except that the $PuO_2$ microspheres were high fired at 1100° C. before contacting at 700° C. with water vapor depleted in $^{18}O$. The final $^{18}O$ content of the $PuO_2$ was 0.198%, indicating that the refractory oxide did not readily exchange oxygen isotopes.

In Examples II and III relatively abundant $^{239}PuO_2$ was substituted for $^{238}PuO_2$ in order to reduce the shielding required and the cost of oxide material. The oxygen exchange properties are substantially identical.

The foregoing description and examples are not intended to restrict the scope of this invention and it should be construed as limited only to the extent indicated by the following appended claims.

What is claimed is:

1. A process for preparing $^{238}PuO_2$ having a low neutron emission rate comprising intimately contacting solid phase $^{238}PuO_2$ with steam depleted in the isotopes $^{17}O$ and $^{18}O$ at sufficient temperature to effect equilibration between the oxygen in said steam and in said $^{238}PuO_2$ and recovering $^{238}PuO_2$ substantially depleted in the isotopes $^{17}O$ and $^{18}O$.

2. The process of claim 1 wherein the temperature of equilibration is between about 500° C. and 800° C.

3. The process of claim 1 wherein the mole ratio of oxygen in the steam to oxygen in the $^{238}PuO_2$ is in the range of from about 1:1 to 10:1.

4. A process for preparing $^{238}PuO_2$ having a relatively low neutron emission rate from $^{238}PuO_2$ having a natural abundance of oxygen isotopes which comprises
   (a) heating said $^{238}PuO_2$ to a temperature in the range of from about 500° C. to 800° C.,
   (b) passing steam that is depleted in at least one isotope selected from the group consisting of $^{17}O$ and $^{18}O$ over said heated $^{238}PuO_2$ in intimate contact therewith, and
   (c) recovering said $^{238}PuO_2$ substantially depleted in at least one of the isotopes selected from the group consisting of $^{17}O$ and $^{18}O$.

5. The process of claim 4 wherein the mole ratio of oxygen in the steam to oxygen in the $^{238}PuO_2$ is in the range of from about 1:1 to 10:1.

References Cited

V. Keshishian, K. M. Broon: Use of $O^{16}$ With $Pu^{238}$ to Reduce Neutron Yield, Trans. Am. Nucl. Soc., 9, 1, 102, June 20, 1966.

Rutherford, et al.: Preparation of O Reduced in Masses 17 and 18 and the Effect on Total Neutrons Emitted From $^{238}PuO_2$ Prepared With This Material, Trans. Am. Nucl. Soc. 9, 2, 599–600, Oct. 30, 1966.

V. G. Finikov: Mechanism of the Isotopic Exchange of O in the Systems Gas-Solid at High Temperature, Nucl. Sci. ABS. 18, 27462.

Boreskov, et al.: Isotopic Exchange of O in The $Al_2O_3$–$O_2$ System, Nucl. Sci. ABS. 19–19872, June 5, 1965.

BENJAMIN R. PADGETT, *Primary Examiner.*

M. J. McGREAL, *Assistant Examiner.*